United States Patent Office 3,780,041
Patented Dec. 18, 1973

3,780,041
N(2,4,6-TRIIODO-3-ACETYLAMINO METHYL) PHENYL GLUTARIMIDE OR SUCCINIMIDE
James H. Ackerman, Bethlehem, N.Y., assignor to Sterling Drug Inc., New York, N.Y.
No Drawing. Continuation-in-part of application Ser. No. 841,604, July 14, 1969, now Patent No. 3,660,408, which is a continuation-in-part of abandoned application Ser. No. 715,583, Mar. 25, 1968. This application Sept. 16, 1971, Ser. No. 181,248
Claims priority, application Canada, Mar. 18, 1969, 46,086
Int. Cl. C07d 29/20
U.S. Cl. 260—281
5 Claims

ABSTRACT OF THE DISCLOSURE

Cyclic imides and anilic acids of 2,4,6-triiodoanilines bearing a substituted amino group in the 3-position are prepared by decarboxylation of the corresponding compounds bearing a carboxyl group in the 5-position. The products are useful as intermediates and as cholecystographic agents.

---

This application is a continuation-in-part of my prior copending application, Ser. No. 841,604, filed July 14, 1969 now U.S. Pat. 3,660,408, which is in turn a continuation-in-part of my prior application, Ser. No. 715,583, filed Mar. 25, 1968, now abandoned.

This invention relates to iodinated aniline derivatives, and more particularly is related to cyclic imides and anilic acids of 2,4,6-triiodoanilines bearing a substituted amino group in the 3-position, and with intermediates and methods for the preparation of these compounds.

A preferred aspect of the invention resides in compounds of the formulas:

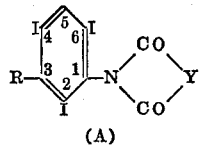 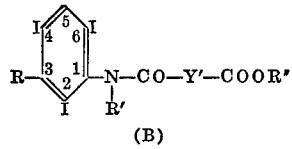

(A)          (B)

wherein Y is a lower-alkylene group wherein 2 or 3 carbon atoms separate the carbonyl groups, vinylene or a 1,3-propylene group wherein the 2-carbon atom is replaced by O, S, SO or $SO_2$; Y' is a single bond, vinylene or an alkylene bridge having from one to eight carbon atoms or such a group interrupted by from one to three identical members selected from O, S, SO and $SO_2$, said members, when more than one, being separated by at least two carbon atoms; R is (lower-alkanoyl)NH, (lower-alkanoyl)$NHCH_2$, (lower-alkanoyl)N(lower-alkyl), (lower-alkoxy-lower-alkanoyl)NH, (lower-alkoxy-lower-alkanoyl)N(lower-alkyl),

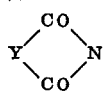

HOOC—Y'—CO—NH, or HOOC—Y'—CO—N(lower-alkyl); R' is hydrogen, lower-alkyl, or hydroxy-lower-alkyl; and R" is hydrogen or lower-alkyl.

In the above Formula A, Y stands for a lower-alkylene group wherein 2 or 3 carbon atoms separate the carbonyl groups and thus can be an ethylene or propylene group optionally substituted by lower-alkyl. The group Y can have from two to six carbon atoms and includes such groups as —$CH_2CH_2$—, —$CH_2CH_2CH_2$—,

—$CH(CH_3)CH_2$—

—$CH_2CH(CH_3)CH_2$—, —$CH(CH_3)CH(CH_3)$—,

—$CH_2CH(C_2H_5)CH_2$—

—$CH(CH_3)CH_2CH_2$—

—$CH(CH_3)CH(CH_3)CH(CH_3)$—

—$CH_2C(CH_3)_2CH_2$—, and the like. Y also stands for a 2-oxa- or 2-thia-1,3-propylene group having from 2 to 4 carbon atoms, for example, —$CH_2OCH_2$—,

—$CH_2SCH_2$—

—$CH_2SOCH_2$—, —$CH_2SO_2CH_2$—, —$CH(CH_3)OCH_2$—, —$CH(CH_3)OCH(CH_3)$—, and the like. The group Y' in Formula B is not limited to a two or three carbon bridge but represents a single bond or a divalent bridge, as hereinabove defined, having from one to eight carbons separating the carbonyl and carboxyl groups, optionally interrupted by from one to three identical members selected from O, S, SO and $SO_2$. The term "interrupted" means, of course, interposed between carbon atoms and not in a terminal position adjacent to the carbonyl groups.

When R in the above Formulas A and B stands for (lower-alkanoyl)NH, (lower-alkanoyl)$NHCH_2$, (lower-alkanoyl)N(lower-alkyl), (lower-alkoxy-lower-alkanoyl)NH or (lower-alkoxy-lower-alkanoyl)N(lower-alkyl), the lower-alkanoyl group has from one to six carbon atoms thus including, for example, formyl, acetyl, propionyl, butyryl, isobutyryl, valeryl, caproyl, and the like.

When R stands for (lower-alkanoyl)N(lower-alkyl), (lower-alkoxy-lower-alkanoyl)N(lower-alkyl), or HOOC—Y'—CO—N(lower-alkyl), and/or R' stands for lower-alkyl, and/or R" stands for lower-alkyl, the lower-alkyl group has from one to four carbon atoms, thus including, for example, methyl, ethyl, propyl, isopropyl, and butyl.

When R stands for (lower-alkoxy-lower-alkanoyl)NH or (lower-alkoxy-lower-alkanoyl)N(lower-alkyl), the lower-alkoxy groups have from one to four carbon atoms and thus include, for example, methoxy, ethoxy, propoxy, isopropoxy, butoxy, and the like.

The compounds of the invention of Formulas A and B above are prepared by decarboxylation of compounds of Formulas C and D, respectively, as follows:

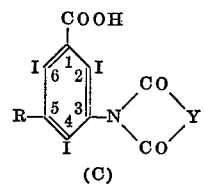 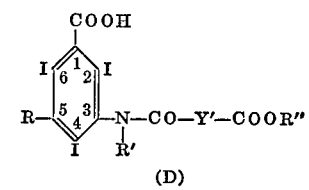

(C)          (D)

wherein Y, Y', R, R' and R" have the same meanings given hereinabove. The decarboxylation is carried out by heating a compound of Formula C or D, either in the free acid or salt form, in an organic solvent. A preferred method is heating the free acid or salt form, for example, the sodium salt, in dimethylformamide at a temperature between about 85 and 140° C.

The intermediate carboxylic acids of Formulas C and D are the subject of my copending application, Ser. No. 808,653, filed Mar. 19, 1969, now U.S. Pat. 3,609,147, a continuation-in-part of abandoned applications Ser. Nos. 550,614 and 715,558, filed May 17, 1966 and Mar. 25, 1968, respectively, and are prepared as described below.

The method of preparation of the compounds of Formulas C and D varies according to the structure desired as follows:

(1) Compounds of Formula C where R is (lower-alkanoyl)NHCH$_2$, (lower - alkanoyl)N(lower - alkyl), (lower-alkoxy-lower-alkanoyl)N(lower-alkyl),

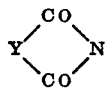

or HOOC—Y—CO—N(lower-alkyl).

(a) Using a dibasic acid anhydride: A compound of the formula

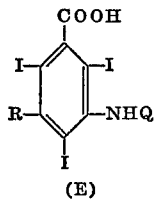

(E)

wherein R has the meaning given above under (1), and Q is hydrogen or lower-alkanoyl, is heated with an acid anhydride of the formula

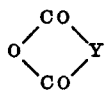

When Y is a lower-alkylene group, the reaction is preferably carried out in the presence of a strong acid catalyst, for example, sulfuric acid or phosphoric acid. When the reaction is carried out with a compound of Formula E where Q is lower-alkanoyl, the lower-alkanoyl group is lost and replaced by the cyclic imide group.

(b) Using a succinyl or glutaryl chloride: A compound of Formula E where Q is hydrogen is heated with a compound of the formula Cl—OC—Y—CO—Cl, where Y is a lower-alkylene group wherein 2 or 3 carbon atoms separate the carbonyl groups, in an inert solvent.

(2) Compounds of Formula D where R' is hydrogen.

(a) Where Y' is within the scope of Y, and R'' is hydrogen: These compounds can be prepared by alkaline hydrolysis of the corresponding compounds of Formula C. The reaction takes place in aqueous solution under mild conditions, at room temperature. Under these conditions the amide linkage to the 3-amino group is unaffected.

(b) Where R is as given under method (1) above: These compounds can be prepared by reacting a compound of Formula E where Q is hydrogen with a half ester half acid chloride, Cl—CO—Y'—CO—OR'', in an inert solvent, affording a compound of Formula D where R'' is lower-alkyl. Hydrolysis of the latter under mild alkaline conditions gives an anilic acid of Formula D where R'' is hydrogen.

(3) Compounds of Formulas C and D wherein R is (lower-alkanoyl)NH or (lower-alkoxy-lower-alkanoyl)NH.

These compounds can be prepared from 3-amino-5-nitrobenzoic acid according to the following flow sheet:

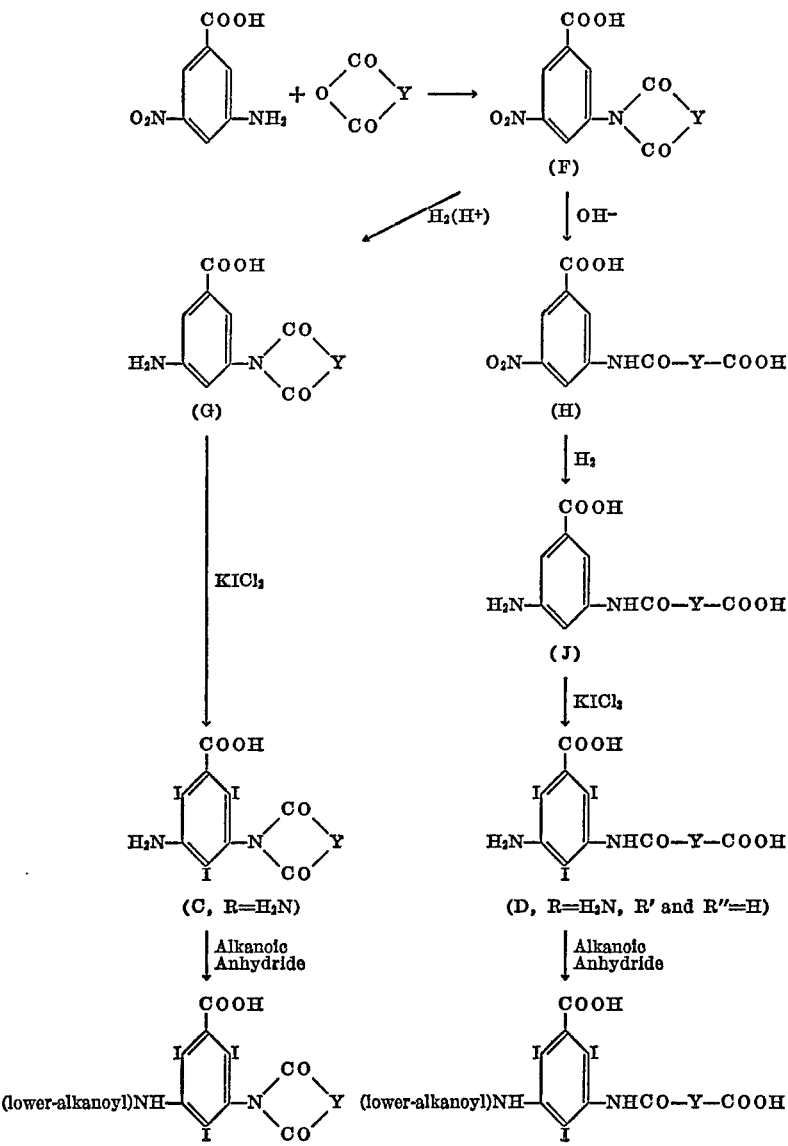

3-amino-5-nitrobenzoic acid is reacted with an anhydride, $O(CO)_2Y$, to give the cyclic imide (F). The latter can either be hydrogenated under acid or neutral conditions to give the amino cyclic imide (G) or hydrolyzed under basic conditions to give the corresponding nitro-anilic acid (H). The nitro-anilic acid in turn can be hydrogenated to the amino-anilic acid (J). Iodination of the amino cyclic imide (G) affords a compound of Formula C where R is $H_2N$, and iodination of the amino-anilic acid (J) gives a compound of Formula D where R is $H_2H$ and R' is H. The primary amino groups can then, if desired, be acylated with a lower-alkanoic acid anhydride or lower-alkoxy-lower-alkanoic acid anhydride to give, respectively, a compound of Formula C where R is (lower-alkanoyl)NH or (lower-alkoxy-lower-alkanoyl)NH, or a compound of Formula D where R is (lower-alkanoyl)NH or (lower-alkoxy-lower-alkanoyl)NH and R' is hydrogen.

(4) Compounds of Formulas C and D where the groups in the 3- and 5-positions are identical.

These are most conveniently prepared from 3,5-diamino-2,4,6-triiodobenzoic acid. The latter is reacted with at least two equivalents of an anhydride, $O(CO)_2Y$, to afford a compound of Formula C where R is $Y(CO)_2N$, which then can be hydrolyzed to a compound of Formula D where R is HOOC—Y—CONH and R' and R" are H. The starting material can also consist of a 3-lower-alkanoylamino-5-amino-2,4,6-triiodobenzoic acid or a 3,5-bis(lower-alkanoylamino)benzoic acid. In the reaction with the anhydride the lower-alkanoyl groups are replaced by cyclic imide groups. Alternatively, a method analogous to method 2(b) above can be used, i.e., reacting 3,5-diamino-2,4,6-triiodobenzoic acid with a half ester half acid chloride Cl—CO—Y'—CO—OR", affording a compound of Formula B where R is R"OCO—Y'—CONH, R' is H and R" is lower-alkyl.

(5) Compounds of Formula D wherein R' is lower-alkyl or hydroxyl-lower-alkyl.

These compounds can be prepared by N-alkylation of the corresponding compounds where R' is hydrogen. The alkylation is effected by the action of a lower-alkyl or hydroxy-lower-alkyl halide, sulfate, alkylsulfonate or arylsulfonate in the presence of aqueous alkali. If the starting material is a compound of Formula D where R is (lower-alkanoyl)NH or HOOC—Y'—CO—NH, alkylation occurs on both nitrogens simultaneously.

The compounds of the invention where Y and/or Y' are alkylene groups interrupted by SO or $SO_2$ can alternatively be prepared by oxidation of the corresponding sulfide (—S—) compounds with a peracid or hydrogen peroxide. The reaction takes place at room temperature in an inert organic solvent.

Alternatively, the compounds of Formulas A and B can be prepared from compounds of the formula:

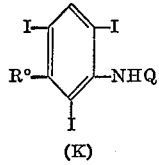

(K)

wherein R° is $H_2N$, (lower-alkanoyl)NH, (lower-alkanoyl)NHCH$_2$, (lower-alkanoyl)N(lower-alkyl), (lower-alkoxy-lower-alkanoyl)N(lower-alkyl),

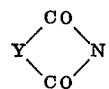

or HOOC—Y—CO—N(lower-alkyl), where Y has the meaning given hereinabove, and Q is hydrogen or lower-alkanoyl, by formation of the cyclic imides and anilic acids by methods analogous to those described above for the preparation of compounds of Formulas C and D. The compounds of Formula K are in turn prepared by decarboxylation of the compounds of Formula E or by other procedures known in the art as illustrated by the specific examples hereinbelow.

The structures of the compounds of the invention were determined by the modes of synthesis, by elementary analysis and by neutral equivalent determinations. The course of the reactions was followed by thin-layer chromatography.

Those compounds of the invention which are carboxylic acids can be obtained in the form of salts derived from inorganic bases or organic amines. Preferred salts are those which are pharmaceutically acceptable, for example, the sodium, magnesium, calcium and N-methylglucamine salts; although all salts are useful either as characterizing derivatives or as intermediates in the purification of the acids.

The compounds of the invention having the formula A wherein R is HOOC—Y'—CO—NH or HOOC—Y'—CO—N(lower-alkyl)

and the compounds of the invention having the formula B are useful as X-ray contrast media for visualization of the gall-bladder (cholecystography). The compounds have intravenous toxicity (approximate $LD_{50}$ values) in the range between 600 and 7500 mg./kg. in mice. The compounds of lesser toxicity, $LD_{50}=1500$ mg./kg. or greater, are primarily useful, in the form of their water-soluble pharmaceutically acceptable salts, as intravenous cholecystographic agents. The compounds having $LD_{50}$ values less than about 1500 mg./kg. are primarily useful, either in the free acid or salt form, as oral cholecystographic agents.

The actual quantitative determination of toxicity and radiopaque effectiveness for a particular compound is readily determined by standard test procedures by technicians trained in pharmacological test procedures, without the need for any extensive experimentation.

The compounds were tested for their intravenous cholecystographic efficacy by standard procedure as follows: The test compound was injected intravenously in the form of an aqueous solution of the sodium or N-methylglucamine salt to cats. Each cat was X-rayed at selected time intervals and the roentgenograms examined and evaluated. The density of the gall-bladder shadows was interpreted in accordance with a numerical scoring plan designated as the Cholecystographic Index (CI), a measure of the efficiency of the test compound, viz.: 0 (none), 1 (poor), 2 (fair), 3 (good), 4 (excellent) [see J. O. Hoppe, J. Am. Pharm. Assoc., Sci. ed. 48, 368–79 (1959)].

In testing for oral cholecystography, the test compound was administered orally in capsules to each of five cats. About eighteen hours later, each cat was X-rayed and the roentgenograms were examined. The density of the gall-bladder shadow evoked by the test compound in each cat was interpreted in accordance with the above numerical scoring plant and the Average Cholecystographic Index (ACI) determined.

The compounds of the invention, upon testing for cholecystographic effectiveness in cats at a dose of 100 mg./kg., were found to produce gallbladder shadows having a Cholecystographic Index of 3.0–4.0 either by oral or by intravenous administration.

The compounds of the invention are prepared for cholecystographic use by dissolving a pharmaceutically acceptable salt from in sterile aqueous medium suitable for intravenous injection; or in capsule or in tablet form with conventional excipients for oral administration.

The compounds of formula A, wherein R is (lower-alkanoyl)NH, (lower-alkanoyl)NHCH$_2$, (lower-alkanoyl)N(lower-alkyl), (lower-alkoxy-lower-alkanoyl)NH, (lower-alkoxy-lower-alkanoyl)N(lower-alkyl) or

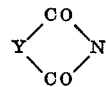

are useful as intermediates, by hydrolytic cleavage, for the preparation of compounds of formula B.

The following examples will further illustrate the invention.

EXAMPLE 1

(a) 3,5-bis(glutarimido)-2,4,6-triiodobenzoic acid [C; R is $(CH_2)_3(CO)_2N$, Y is $CH_2CH_2CH_2$] was prepared from 265 g. of 3,5-diamino-2,4,6-triiodobenzoic acid, 400 g. of glutaric anhydride and 18 ml. of concentrated sulfuric acid, heated and stirred for seventeen hours. The product was recrystallized from dimethyl sulfoxide, adding water to induce precipitation, and was obtained as a light gray solid with one mole of dimethyl sulfoxide of crystallization, M.P. above 300° C. A sample of the acid was converted to its sodium salt form, M.P. 288–291° C. (dec.) when recrystallized from water.

(b) N,N'-(2,4,6 - triiodo - m - phenylene)diglutarimide [A; R is $(CH_2)_3(CO)_2N$, Y is $CH_2CH_2CH_2$]. A mixture of 89.10 g. of sodium 3,5-bis(glutarimido)-2,4,6-triiodobenzoate and 400 ml. of dimethylformamide was warmed at 85° C. for 20 minutes to effect solution, and then heated at reflux temperature (130–135° C.) for four hours. The solution was cooled, and the solid product collected, washed with dimethylformamide and acetone, and dried to constant weight (35.18 g.). An additional 41.75 g. of product was obtained by diluting the filtrate with water. The combined product was recrystallized from acetic acid, using activated charcoal for decolorizing purposes, to give N,N'-(2,4,6-triiodo-m-phenylene)diglutarimide, colorless prisms, M.P. above 300° C.

N,N'-(2,4,6-triiodo - m - phenylene)diglutarimide can also be prepared by reacting 3-amino-2,4,6-triiodoaniline (K; R° is $H_2N$, Q is H), 3-amino-2,4,6-triiodoacetanilide (K; R° is $H_2N$, Q is $COCH_3$), or 3-acetamido-2,4,6-triiodoacetanilide (K; R° is $CH_3CONH$, Q is $COCH_3$) with glutaric anhydride according to the procedure of Example 1, part (a).

EXAMPLE 2

(a) 3-glutarimido-5-(N-methylacetamido)-2,4,6-triiodobenzoic acid [C; R is $CH_3CON(CH_3)$, Y is $CH_2CH_2CH_2$]. A mixture of 117.2 g. of 3-amino-5-(N-methylacetamido)-2,4,6-triiodobenzoic acid and 182 g. of glutaric anhydride was heated with stirring on a steam bath. Concentrated sulfuric acid (10 ml.) was added, and heating and stirring were continued for seven hours. The reaction mixture was added to 700 ml. of water, and the solid product was collected by filtration and recrystallized from acetic acid. The resulting 3 - glutarimido-5-(N-methylacetamido)-2,4,6-triiodobenzoic acid was converted to its sodium salt form as follows: the free acid was slurried with 40 ml. of methanol and a 1 N solution of sodium hydroxide in methanol was added with trituration until the solid had dissolved. The sodium salt was precipitated out with ether, and the resulting gum was triturated with ether and dissolved in methanol. The latter solution was decolorized with activated charcoal and the product reprecipitated with ether. The product was dissolved in water and the solution filtered and concentrated in vacuo. The residue was dried in vacuo to give the sodium salt of 3-glutarimido-5-(N-methylacetamido)-2,4,6-triiodobenzoic acid as a pale pink solid, M.P. 200–204° C. (dec.).

(b) N - [2,4,6 - triiodo-3-(N-methylacetamido)phenyl] glutarimide [A; R is $CH_3CON(CH_3)$, Y is $CH_2CH_2CH_2$] can be prepared by decarboxylation of sodium 3-glutarimido-5-(N-methylacetamido)-2,4,6-triiodobenzoate according to the procedure of Example 1(b); or by decarboxylation of 3-acetamido-5-(N-methylacetamido)-2,4,6-triiodobenzoic acid followed by reacting the resulting 3-(N-methylacetamido)-2,4,6-triiodoacetanilide [K; R° is $CH_3CON(CH_3)$ Q is $COCH_3$] with glutaric anhydride.

By replacing the 3-amino-5-(N-methylacetamido)-2,4,6-triiodobenzoic acid in the foregoing preparation by a molar equivalent amount of 3-amino-5-(N-butylacetamido)-2,4,6-triiodobenzoic acid, 3-amino-5-(N-methylpropionamido)-2,4,6-triiodobenzoic acid, 3-amino-5-(N-methylcaproylamino)-2,4,6-triiodobenzoic acid, 3-amino-5-(N,N-dimethylcarbamoyl)-2,4,6-triiodobenzoic acid, or 3-amino-5 - (N - methyl-2-methoxyacetamido)-2,4,6-triiodobenzoic acid, there can be obtained, respectively, 3-glutarimido-5-(N-butylacetamido)-2,4,6-triiodobenzoic acid [C; R is $CH_3CON(C_4H_9)$, Y is $CH_2CH_2CH_2$], 3-glutarimido-5-(N-methylpropionamido)-2,4,6-triiodobenzoic acid [C; R is $CH_3CH_2CON(CH_3)$, Y is $CH_2CH_2CH_2$], 3-glutarimido-5-(N-methylcaproylamino)-2,4,6-triiodobenzoic acid [C; R is $CH_3(CH_2)_4CON(CH_3)$, Y is $CH_2CH_2CH_2$], 3-glutarimido-5-(N,N-dimethylcarbamoyl)-2,4,6-triiodobenzoic acid [C; R is $(CH_3)_2NCO$, Y is $CH_2CH_2CH_2$], or 3-glutarimido - 5-(N-methyl-2-methoxyacetamido)-2,4,6-triiodobenzoic acid [C; R is $CH_3OCH_2CON(CH_3)$, Y is $CH_2CH_2CH_2$]

which in turn can be decarboxylated to give, respectively, N - [2,4,6 - triiodo-3-(N-butylacetamido)phenyl]glutarimide [A; R is $CH_3CON(C_4H_9)$, Y is $CH_2CH_2CH_2$], N-[2,4, 6 - triiodo-3-(N-methylpropionamido)phenyl]glutarimide [A; R is $CH_3CH_2CON(CH_3)$, Y is $CH_2CH_2CH_2$], N-[2,4, 6 - triiodo-3-(N-methylcaproylamino)phenyl]glutarimide [A; R is $CH_3(CH_2)_4CON(CH_3)$, Y is $CH_2CH_2CH_2$], N-[2,4,6 - triiodo-3-(N,N-dimethylcarbamoyl)phenyl]glutarimide [A; R is $(CH_3)_2NCO$, Y is $CH_2CH_2CH_2$], or N-[2, 4,6 - triiodo - 3-(N-methylmethoxyacetamido)phenyl]glutarimide [A; R is $CH_3OCH_2CON(CH_3)$, Y is $CH_2CH_2CH_2$].

EXAMPLE 3

(a) 3 - succinimido-5-(N-methylacetamido)-2,4,6-triiodobenzoic acid [C; R is $CH_3CON(CH_3)$, Y is $CH_2CH_2$] was prepared from 87.9 g. of 3-amino-5-(N-methylacetamido)-2,4,6-triiodobenzoic acid, 120 g. of succinic anhydride and 6 ml. of sulfuric acid according to the procedure of Example 2, except that a reaction temperature of 130–140° C. was used. The reaction was essentially complete after 30 minutes heating time. The compound was isolated in the form of its sodium salt, pale yellow solid, M.P. 220–222° C. (dec.).

(b) N-[2,4,6 - triiodo - 3 - (N-methylacetamido)phenyl]succinimide [A; R is $CH_3CON(CH_3)$, Y is $CH_2CH_2$] can be prepared by heating sodium 3-succinimido-5-(N-methylacetamido)-2,4,6-triiodobenzoate in dimethylformamide by the method described in Example 1(b).

EXAMPLE 4

(a) 3-(3-methylglutarimido)-5 - (N-methylacetamido)-2,4,6-triiodobenzoic acid [C; R is $CH_3CON(CH_3)$, Y is $CH_2CH(CH_3)CH_2$] was prepared from 3-amino-5-(N-methylacetamido) - 2,4,6 - triiodobenzoic acid, 3-methylglutaric anhydride and sulfuric acid according to the procedure of Example 2. The product was isolated in the free acid form, M.P. 301–302° C. (dec.) when recrystallized from acetic acid.

(b) N-[2,4,6 - triiodo - 3 - (N-methylacetamido)phenyl]-3-methylglutarimide [A; R is $CH_3CON(CH_3)$, Y is $CH_2CH(CH_3)CH_2$] can be prepared by heating sodium 3-succinimido-5-(N - methylacetamido)-2,4,6-triiodobenzoate in dimethylformamide by the method described in Example 1(b).

The following compounds were prepared following the procedure of Example 1 from the appropriate 3-amino-5-R-2,4,6-triiodobenzoic acid and acid anhydride.

EXAMPLE 5

3-(3,3 - dimethylglutarimido)-5-(N-methylacetamido)-2,4,6-triiodobenzoic acid [C; R is $CH_3CON(CH_3)$, Y is $CH_2C(CH_3)_2CH_2$], pale tan solid, M.P. 274–278° C. (dec.) (from acetic acid); sodium salt form, pale yellow solid, M.P. 235–245° C. (dec.).

EXAMPLE 6

3-glutarimido-5-(N - ethylacetamido)-2,4,6-triiodobenzoic acid [C; R is CH₃CON(C₂H₅), Y is CH₂CH₂CH₂], sodium salt form, M.P. above 220° C.

EXAMPLE 7

3-(methylsuccinimido)-5-(N - methylacetamido)-2,4,6-triiodobenzoic acid [C; R is CH₃CON(CH₃), Y is

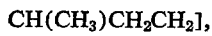

M.P. 285–287° C. (from acetic acid); sodium salt form, M.P. above 245° C. (dec.).

The compounds of Examples 5, 6 and 7 can be decarboxylated by the method of Example 1(b) to produce, respectively, N-[2,4,6-triiodo - 3 - (N-methylacetamido) phenyl]-3,3-dimethylglutarimide [A; R is

CH₃CON(CH₃),

Y is CH₂C(CH₃)₂CH₂], N-[2,4,6-triiodo-3-(N-ethylacetamido)phenyl]glutarimide; [A; R is CH₃CON(C₂H₅), Y is CH₂CH₂CH₂], and N-[2,4,6-triiodo-3-(N-methylacetamido)phenyl]methylsuccinimide [A; R is

CH₃CON(CH₃),

EXAMPLE 8

(a) N,N'-(2,4,6 - triiodo-α,m-toluylene)bis[acetamide] [K; R° is CH₃CONHCH₂, Q is COCH₃] was prepared by decarboxylation of 3-acetamido - 5 - acetamidomethyl-2,4,6-triiodobenzoic acid according to the method of Example 1(b), and was obtained in the form of a colorless solid, M.P. 287–288° C. when recrystallized from acetic acid.

(b) N-[2,4,6-triiodo - 3 - (acetylaminomethyl)phenyl]glutarimide [A; R is CH₃CONHCH₂, Y is CH₂CH₂CH₂] was prepared by interacting α-acetamido-2',4',6'-triiodo-m-acetotoluidide with glutaric anhydride according to the method of Example 2(a), and was obtained in the form of a colorless solid, M.P. 128–134° C. when recrystallized from isopropyl alcohol.

I claim:

1. A compound of the formula

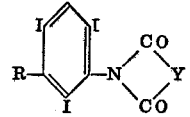

wherein Y is a lower-alkylene group wherein 2 or 3 carbon atoms separate the carbonyl groups; and R is (lower-alkanoyl)NH, (lower-alkanoyl)NHCH₂, (lower-alkanoyl) N(lower - alkyl), (lower-alkoxy-lower-alkanoyl) NH, or (lower-alkoxy-lower-alkanoyl)N(lower-alkyl).

2. A compound according to claim 1 wherein R is (lower-alkanoyl)N(lower-alkyl).

3. N-[2,4,6 - triiodo - 3 - (acetylaminomethyl)phenyl] glutarimide, according to claim 1 where R is

4. N-[2,4,6-triiodo - 3 - (N-methylacetamido)phenyl] glutarimide, according to claim 2.

5. N-[2,4,6-triiodo - 3 - (N-methylacetamido)phenyl] succinimide, according to claim 2.

References Cited
UNITED STATES PATENTS
3,655,669  11/1972  Ackerman _____ 260—281

DONALD G. DAUS, Primary Examiner